United States Patent [19]

Bounds

[11] 4,231,527
[45] Nov. 4, 1980

[54] CATCHER DEVICE FOR CONDIMENT MILL

[76] Inventor: William E. Bounds, 23790 Hawthorne Blvd., Torrance, Calif. 90505

[21] Appl. No.: 31,615

[22] Filed: Apr. 19, 1979

[51] Int. Cl.³ .............................................. A47J 42/40
[52] U.S. Cl. ................................................ 241/169.1
[58] Field of Search ..................... 241/168, 169, 169.1, 241/169.2

[56] References Cited

U.S. PATENT DOCUMENTS

| 1,166,743 | 1/1916 | Cochran | 241/168 UX |
| 3,136,491 | 6/1964 | Posmanter | 241/169.1 |
| 3,168,256 | 2/1965 | Bounds et al. | 241/169.1 |
| 3,734,417 | 5/1973 | Russell et al. | 241/168 |
| 4,082,230 | 4/1978 | Bounds | 241/169.1 |

FOREIGN PATENT DOCUMENTS 1305720  8/1962  France ..................................... 241/168

*Primary Examiner*—Howard N. Goldberg
*Attorney, Agent, or Firm*—Edward A. Sokolski

[57] ABSTRACT

A condiment mill has a catcher device installed on the bottom thereof opposite the grinder in the form of a dished plate which catches condiment grindings left over after the condiment mill has been used.

2 Claims, 5 Drawing Figures

CATCHER DEVICE FOR CONDIMENT MILL

This invention relates to condiment mills, such as pepper mills and the like, and more particularly to such a device having a catcher device for catching surplus ground condiment particles.

In the use of a condiment mill, such as described in U.S. Pat. No. 3,168,256 of which I am a co-inventor, quite often after the mill has been used a certain amount of surplus condiment will be left in the grinder mechanism which will fall on the table when the mill is jarred by the impact in placing it in an upright position thereon. This of course is somewhat unsightly and also could lead to discomfort should these grindings be accidentally blown into one's face. The present invention overcomes these shortcomings in prior art condiment mills by providing an effective catcher device which is installed on the bottom of the condiment mill beneath the grinder mechanism such that it effectively catches surplus grindings but does not interfere with the dispensing of the condiment.

It is therefore an object of this invention to minimize the inadvertent dispensing of a condiment from a condiment mill after the mill has been used.

It is a further object of this invention to provide a catcher device for catching condiment particles which may inadvertently fall vertically from a condiment mill, but which does not interfere with the dispensing of the condiment.

Other objects of this invention will become apparent as the description proceeds in connection with the accompanying drawings of which:

Figure 1:
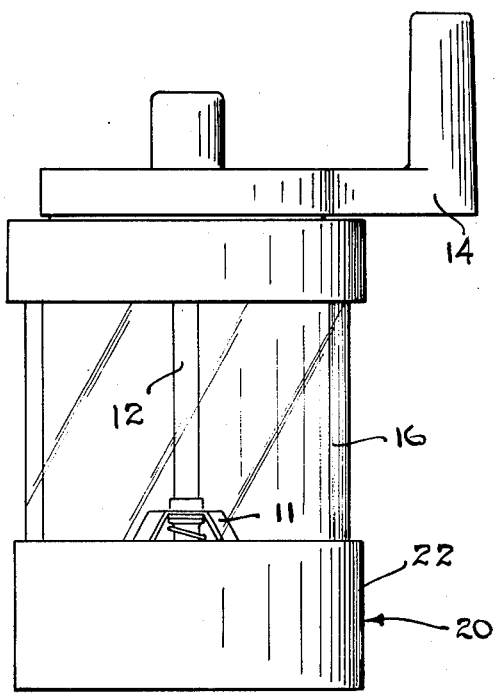
FIG. 1 is a side-elevational view of a condiment mill incorporating the device of the invention.
Figure 2:
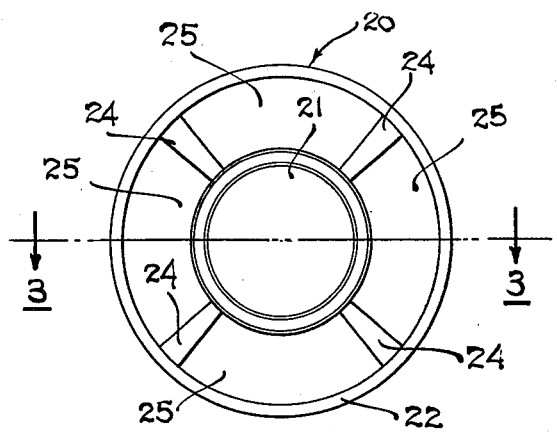
FIG. 2 is a bottom plan view of the condiment mill of FIG. 1.
Figure 4:
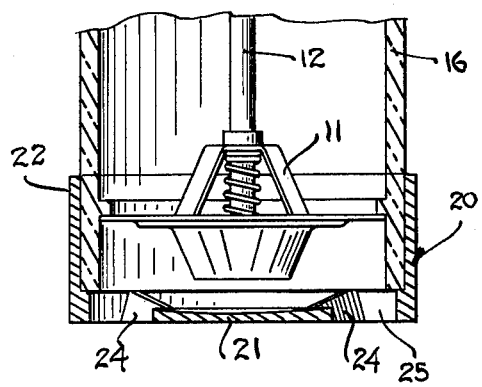
FIG. 4 is a cross-sectional view illustrating the catcher device of the invention installed on the condiment mill.
Figure 3:
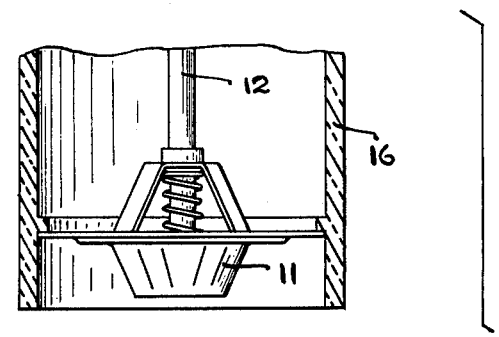
FIG. 3 is a cross-sectional exploded view showing the catcher device of the invention separated from the main body of the condiment mill.
Figure 3:
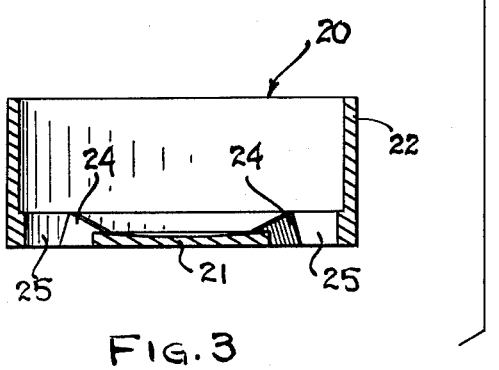

Briefly described, the device of the present invention comprises a frame member which may be cylindrical in form which has a dish-shaped plate member suspended inwardly thereof, there being a substantial opening formed between the frame member and the dish-shaped plate. The cylindrical frame member in the preferred embodiment is force-fitted over the lowermost portions of the outer walls of the container of the condiment mill with the dish-shaped plate member having its concave (dished) surface immediately beneath the grinding mechanism of the mill. Surplus condiment which may fall from the mill after it has been used is thus caught by the catcher device and retained therein until the mill is next used and turned angularly over the food.

Referring now to FIGS. 1–4, a preferred embodiment of the invention is illustrated. A condiment mill has a grinder mechanism 11 which may be of the type described in the aforementioned U.S. Pat. No. 3,168,256 which is rotatably driven by means of shaft 12 which in turn is driven by means of hand crank 14. The grinder has a cylindrical transparent container 16 in which the condiment is stored and on which the grinder is supported. Catcher device 20 has a centrally located concave or dished plate portion 21 and an outer peripheral cylindrical frame portion 22 from which the dished portion is supported by means of web members 24. Substantially large spaces 25 are formed between web portions 24, dished portion 21 and frame portion 22. Thus, as can be seen, after the device has been used for grinding condiment, excess condiment which may fall from grinder 11 is caught in dish-shaped member 21. The mill is preferably held at an angle while being used so that the ground condiment falls sidewise from the grinder and out through openings 25. It is to be noted that the catcher device also serves to protect the grinder mechanism from inadvertent damage and in addition has cosmetic value.

Figure 5:
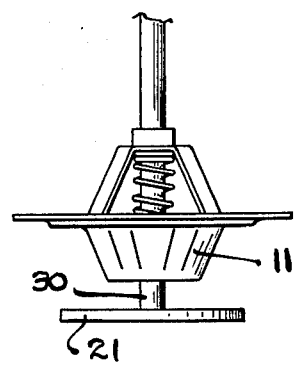
FIG. 5 is a side elevational view illustrating a second embodiment of the invention.

Referring now to FIG. 5, a second embodiment of the invention is illustrated. In this second embodiment the catcher plate 21 is fixedly attached to shaft 30 which in turn is fixedly attached to the grinder 11 and this rotates therewith.

While the invention has been described and illustrated in detail, it is clearly to be understood that this is intended by way of illustration and example only and is not to be taken by way of limitation, the spirit and scope of this invention being limited only by the terms of the following claims.

I claim:

1. In a condiment mill having a cylindrical container member for containing the condiment and a grinder mechanism supported in said container member towards the bottom end thereof, there being an opening in said container member opposite the grinder for use in dispensing the condiment from said bottom end, and a catcher device attached to the bottom end of said container member and positioned in said opening opposite said grinder comprising a cylindrical frame member attached to said container member, said frame member being force-fitted over the bottommost portions of the outer walls of said container member, a plate member having a concave dish-shaped surface, and means for suspending said plate member with the dish-shaped surface thereof directly facing the grinder mechanism, there being a large opening formed between the frame member and the plate member to permit the passage of condiment from said grinder mechanism therethrough, said suspending means comprising a plurality of web members extending between the plate and frame members, whereby surplus condiment falling from the grinder mechanism is caught in the dish-shaped portion of the plate member.

2. The condiment mill of claim 1 wherein there are four narrow web members running between the bottom edge of the frame member and the plate member.

* * * * *